Nov. 15, 1927.
E. J. FAGAN
1,649,158
RADIUS ROD REENFORCEMENT
Filed Oct. 11, 1926
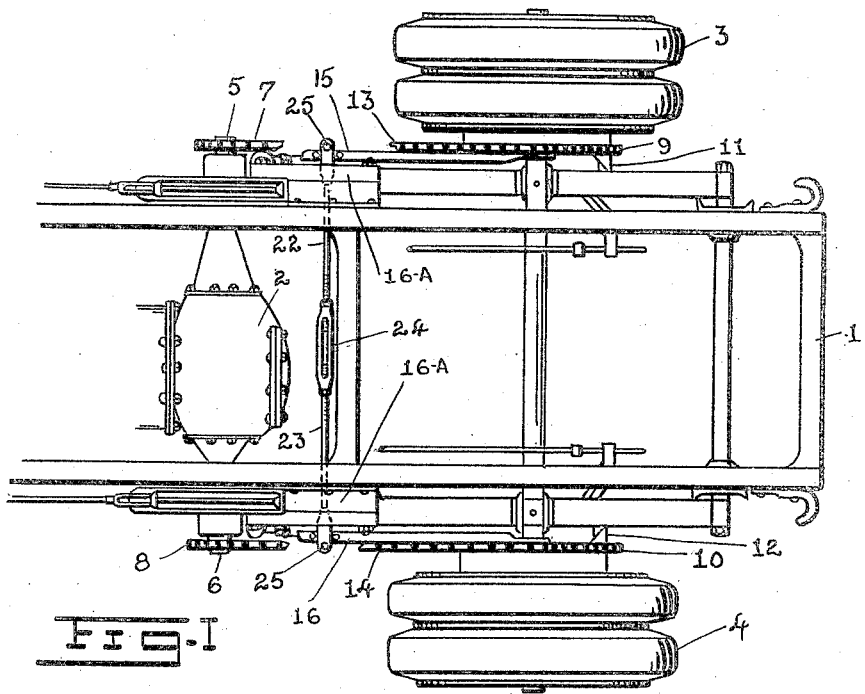
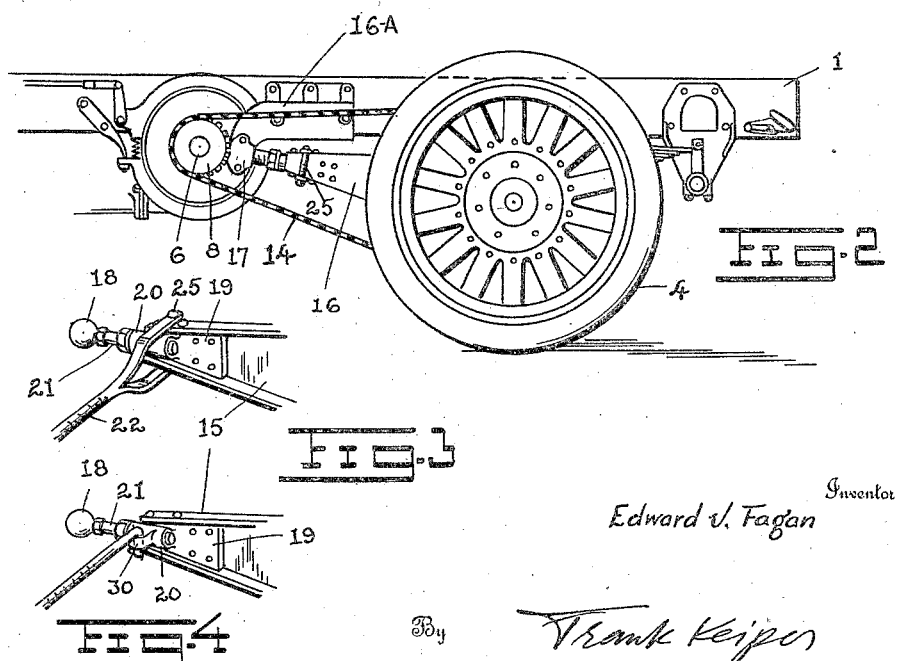
Inventor
Edward J. Fagan
By Frank Keiper
Attorney Patented Nov. 15, 1927.

1,649,158

UNITED STATES PATENT OFFICE.

EDWARD J. FAGAN, OF ROCHESTER, NEW YORK.

RADIUS-ROD REENFORCEMENT.

Application filed October 11, 1926. Serial No. 140,799.

The object of this invention is to provide a radius rod reenforcement for a pair of radius rods located parallel to each other to prevent these rods from buckling and breaking without preventing the radius rods from moving separately to keep the centers which they space in line with each other.

These and other objects of this invention will be fully illustrated in the drawing, described in the specification and pointed out in the claim at the end thereof.

In the accompanying drawing:

Figure 1 is a top plan view of the rear portion of a truck chassis in which the rear axle is held in line with a jack shaft by means of a pair of radius rods that are reenforced in accordance with my invention.

Figure 2 is a side elevation of the rear chassis section illustrated in Figure 1.

Figure 3 is a detail perspective view of the front end of one of the radius rods with the reenforcing cross brace attached thereto.

Figure 4 is a perspective view similar to that of Figure 3 showing a modified form of attachment of the cross brace.

In the several figures of the drawing like reference numerals indicate like parts.

In trucks of the type in which sprockets and sprocket chains are used to transmit the power to the rear wheels of the trucks the power is taken from jack shafts driven by differential gearing. In the chassis 1 illustrated in the figures of the drawing the differential gear housing 2 is suitably suspended forward of the rear wheels 3 and 4. The jack shafts 5 and 6 project from either side of the differential gear housing and have the sprockets 7 and 8 keyed thereon.

The rear axle of the truck is fixed and has the wheels 3 and 4 pivotally mounted at each end thereof. To the wheels are fastened the sprocket wheels 9 and 10 and brake drums 11 and 12 respectively. The sprocket chains 13 and 14 pass over the sprocket 7 and sprocket wheel 9 and the sprocket 8 and sprocket wheel 10 respectively.

In order to hold the center of the jack shafts in line with the center of the wheels 3 and 4 and the sprocket wheels 9 and 10 fastened thereto, the radius rods 15 and 16 are provided. The rear ends of these radius rods are rigid with the sprocket wheels 9 and 10 while the front end is attached to the frame of the chassis by means of a ball and socket joint. For this purpose a bracket 16ᴬ is mounted on each side of the frame 1 and on this bracket is formed a ball socket 17 into which engages the ball 18 provided at the front end of each radius rod. Each radius rod comprises a triangular channel bent up of heavy sheet metal of which the wide end is fixed to the rear sprocket and brake drum.

The narrow forward end of each radius rod has the bracket 19 suitably fastened thereto and on this bracket is provided a longitudinal boss 20 in which the stud 21 is held in place. The stud 21 has the ball 18 formed on its outer end and when placed into the ball socket 17 connects the front end of the radius rod to the bracket 16ᴬ of the chassis frame. The radius rods thus hold the sprocket and sprocket wheel in line with each other so as to keep the sprocket chain in mesh therewith.

In the use of a truck it many times happens especially when driving into or out of a depression that one of the rear wheels does not travel on the same plane as the other. While the sprockets are held in line with each other by the radius rods in such a case an unequal strain is brought to bear on the radius rod and will cause the radius rod to buckle. This buckling takes place at the forward end of the radius rod and bends the radius rod outwardly, that is away from the chassis at this point. When a radius rod has buckled, it locks the sprocket wheel to which it is attached and prevents further movement of the rear wheel.

My invention which prevents this buckling while allowing free movement of the radius rods otherwise consists of a pair of bracing rods 22 and 23 which are joined together with a turnbuckle 24. The outer ends of these bracing rods are bifurcated and embrace the small end of the radius rods at the point where the bracket 19 is attached thereto. A bolt 25 passes thru the bifurcated ends of the bracing rods 22 and 23 on the outside of the radius rods so that when the turnbuckle 24 is rotated it draws the bracing rods together and firmly ties these radius rods together to prevent their buckling outwardly. While the bracing rods tie the radius rods together and prevent their buckling their connection with the radius rods is such that the tying together does not prevent the radius rods from individually moving in a vertical plane to keep the centers of the sprockets in line with each other when the rear wheels travel over uneven ground.

In Figure 4 I have illustrated a modified form of attachment of the brace rods to the radius rods. In this modification, boss 30 is formed integral with the boss 20 and in this boss 30 is formed an eye into which the L shaped end of the brace rods engage. A cotter pin or other suitable retaining device is attached to the downwardly projecting end of the bracing rod to prevent the rod from disengagement from the radius rod.

I claim:

In a radius rod connection for connecting an axle with the chassis supported by the axle and comprising a pair of radius rods having a pivotal connection between the fixed axle and the chassis, the combination of a cross brace fastening said pair of radius rods together at opposite points and fastening means carried at the ends of said cross brace and connecting the ends of said cross brace to said radius rods to allow an angular movement of said radius rods in unison with each other and independent of each other while bracing said radius rods from each other to prevent an outward buckling of the radius rods in any angular position with relation to each other and the chassis supported by said axle.

In testimony whereof I affix my signature.

EDWARD J. FAGAN.